United States Patent
Inamori

(10) Patent No.: US 10,209,150 B2
(45) Date of Patent: Feb. 19, 2019

(54) STRAIN GAUGE

(71) Applicant: Minebea Mitsumi Inc., Nagano (JP)

(72) Inventor: Dohaku Inamori, Saku (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/724,304

(22) Filed: Oct. 4, 2017

(65) Prior Publication Data
US 2018/0113034 A1    Apr. 26, 2018

(30) Foreign Application Priority Data

Oct. 21, 2016 (JP) .................................. 2016-206958

(51) Int. Cl.
*H01C 1/16* (2006.01)
*G01L 1/22* (2006.01)
*G01B 7/16* (2006.01)
*H01C 17/24* (2006.01)

(52) U.S. Cl.
CPC .............. *G01L 1/2287* (2013.01); *G01B 7/18* (2013.01); *H01C 1/16* (2013.01); *H01C 17/24* (2013.01)

(58) Field of Classification Search
CPC .......... H01C 1/16; H01C 17/24; G01L 1/2287
See application file for complete search history.

(56) References Cited

U.S. PATENT DOCUMENTS

| | | | | |
|---|---|---|---|---|
| 2,953,764 A | * | 9/1960 | Tellkamp | H01C 1/032 338/309 |
| 4,146,867 A | * | 3/1979 | Blangeard | H01C 7/22 338/195 |
| 4,146,957 A | * | 4/1979 | Toenshoff | G01K 7/183 29/612 |
| 4,342,217 A | * | 8/1982 | Paetow | G01L 1/2287 338/2 |
| 4,432,247 A | * | 2/1984 | Takeno | G01L 1/2206 338/2 |
| 4,777,826 A | | 10/1988 | Rud, Jr. et al. | |
| 4,859,981 A | * | 8/1989 | Peschl | H01C 7/22 338/195 |
| 2005/0139018 A1 | | 6/2005 | Haggstrom | |
| 2012/0247220 A1 | * | 10/2012 | Inamori | G01B 7/18 73/766 |

FOREIGN PATENT DOCUMENTS

| | | |
|---|---|---|
| JP | 04-133401 A | 5/1992 |
| JP | 5890989 B2 | 3/2016 |

OTHER PUBLICATIONS

Extended European Search Report dated Mar. 20, 2018 in a corresponding EP Application No. 17195897.8.

* cited by examiner

Primary Examiner — Kyung S Lee
(74) Attorney, Agent, or Firm — Pearne & Gordon LLP

(57) ABSTRACT

There is provided a strain gauge having both reduced size and symmetry. The strain gauge includes at least four grid resistor connected to each other in series, and at least three trim resistors each connected to a series circuit in parallel, the series circuit being constituted by two grid resistors adjacent to each other ($R_1,R_2$; $R_2,R_3$; $R_3,R_4$) of the at least four grid resistors. The at least four grid resistors have resistance values different from one another.

7 Claims, 7 Drawing Sheets

STRAIN GAUGE

CROSS REFERENCE TO RELATED APPLICATIONS

This application claims the benefit of Japanese Patent Application No. 2016-206958, filed Oct. 21, 2016, which is hereby incorporated by reference in its entirety.

BACKGROUND

Technical Field

The present disclosure relates to a strain gauge.

Background

In a conventional strain gauge including a resistor having a zigzag shape patterned on an insulating substrate of the strain gauge, a resistance value is adjusted by trimming part of a resistance pattern. For example, in Japanese Patent No. 5890989, as illustrated in FIG. 7, a thin-film resistor is disclosed, the thin-film resistor including a first resistor pattern r1 folded in a zigzag manner and second resistor patterns r2 each connected in parallel to the first resistor pattern r1 at folded portions of the first resistor pattern r1 adjacent to each other, one or some of the second resistor patterns r2 are trimmed.

SUMMARY

However, in a case of the thin-film resistor described in Japanese Patent No. 5890989 described above, one second resistor pattern r2 is provided for four folded portions of the first resistor pattern r1 (two folded portions on a ridge side and two folded portions on a trough side). Therefore, a width of the strain gauge is made large. Furthermore, the second resistor patterns r2 are provided at folded portions only on one side of the first resistor pattern r1 (the ridge side or the trough side, the ridge side in FIG. 7). Therefore, symmetry of the strain gauge is lost.

Thus, the objective of the present disclosure is to solve the above-described problems and to provide a small and symmetrical strain gauge.

The gist of the present disclosure is as follows.

A strain gauge including:

at least four grid resistors ($R_1$, $R_2$, $R_3$, $R_4$) connected to each other in series; and at least three trim resistors ($R_A$, $R_B$, $R_C$) each connected to a series circuit in parallel, the series circuit being constituted by two grid resistors adjacent to each other ($R_1$,$R_2$; $R_2$,$R_3$; $R_3$,$R_4$), of the at least four grid resistors ($R_1$, $R_2$, $R_3$, $R_4$), wherein the at least four grid resistors ($R_1$, $R_2$, $R_3$, $R_4$) have resistance values different from one another.

In the strain gauge, it is preferable that the at least four grid resistors ($R_1$, $R_2$, $R_3$, $R_4$) are patterned in such a manner as to be folded in a zigzag manner at each of the grid resistors, and include folded portions each formed on a ridge side or a trough side, and each of the at least three trim resistors ($R_A$, $R_B$, $R_C$) is connected between folded portions adjacent to each other on the ridge side or between folded portions adjacent to each other on the trough side.

In the strain gauge, it is preferable that the at least four grid resistors ($R_1$, $R_2$, $R_3$, $R_4$) have a uniform line width and have lengths different from each other.

DETAILED DESCRIPTION

Hereinafter, embodiments of a strain gauge according to the present disclosure will be described in detail by way of example, with reference to the drawings.

Figure 1:
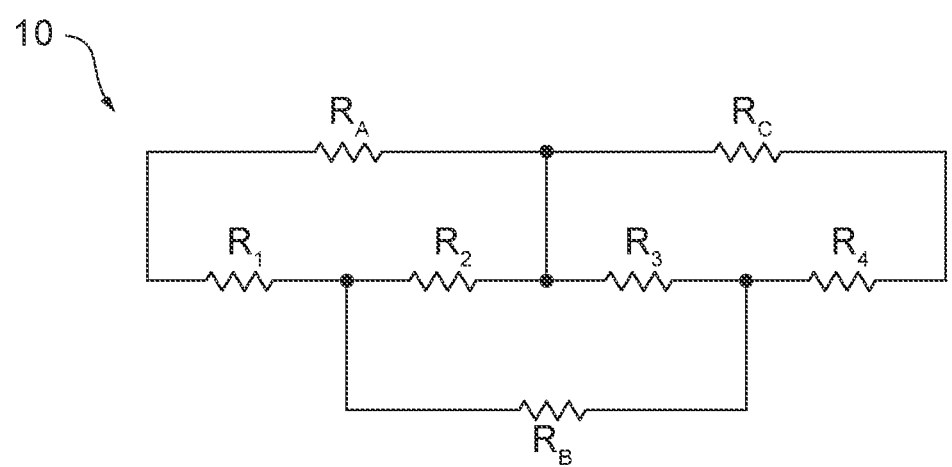
FIG. 1 is a circuit diagram of a strain gauge according to a first embodiment of the present disclosure.

FIG. 1 illustrates a circuit diagram of a strain gauge according to a first embodiment of the present disclosure.

As illustrated with a circuit diagram 10 in FIG. 1, the strain gauge includes four grid resistors ($R_1$, $R_2$, $R_3$, $R_4$) connected to each other in series and three trim resistors ($R_A$, $R_B$, $R_C$). The trim resistor $R_A$ is connected to a series circuit in parallel, the series circuit being constituted by two grid resistors ($R_1$, $R_2$) adjacent to each other, the trim resistor $R_B$ is connected to a series circuit in parallel, the series circuit being constituted by two grid resistors ($R_2$, $R_3$) adjacent to each other, and the trim resistor $R_C$ is connected to a series circuit in parallel, the series circuit being constituted by two grid resistors ($R_3$, $R_4$) adjacent to each other.

The four grid resistors ($R_1$, $R_2$, $R_3$, $R_4$) have resistance values different from one another.

In addition, the three trim resistors ($R_A$, $R_B$, $R_C$) also have resistance values different from one another. Furthermore, the resistance values of the three trim resistors ($R_A$, $R_B$, $R_C$) may be different from the resistance values of the four grid resistors ($R_1$, $R_2$, $R_3$, $R_4$).

A combined resistance of the circuit diagram 10 can be adjusted by disconnecting one or more of the three trim resistors ($R_A$, $R_B$, $R_C$) by laser trimming or the like. In accordance with whether any one or more of the three trim resistors ($R_A$, $R_B$, $R_C$) is disconnected, the combined resistance can be adjusted in eight possible ways as follows.

(1) Disconnect none of the three trim resistors ($R_A$, $R_B$, $R_C$)
(2) Disconnect only the trim resistor $R_A$
(3) Disconnect only the trim resistor $R_B$
(4) Disconnect only the trim resistor $R_C$
(5) Disconnect two trim resistors ($R_A$, $R_B$)
(6) Disconnect two trim resistors ($R_A$, $R_C$)
(7) Disconnect two trim resistors ($R_B$, $R_C$)
(8) Disconnect the three trim resistors ($R_A$, $R_B$, $R_C$)

Figure 2A:
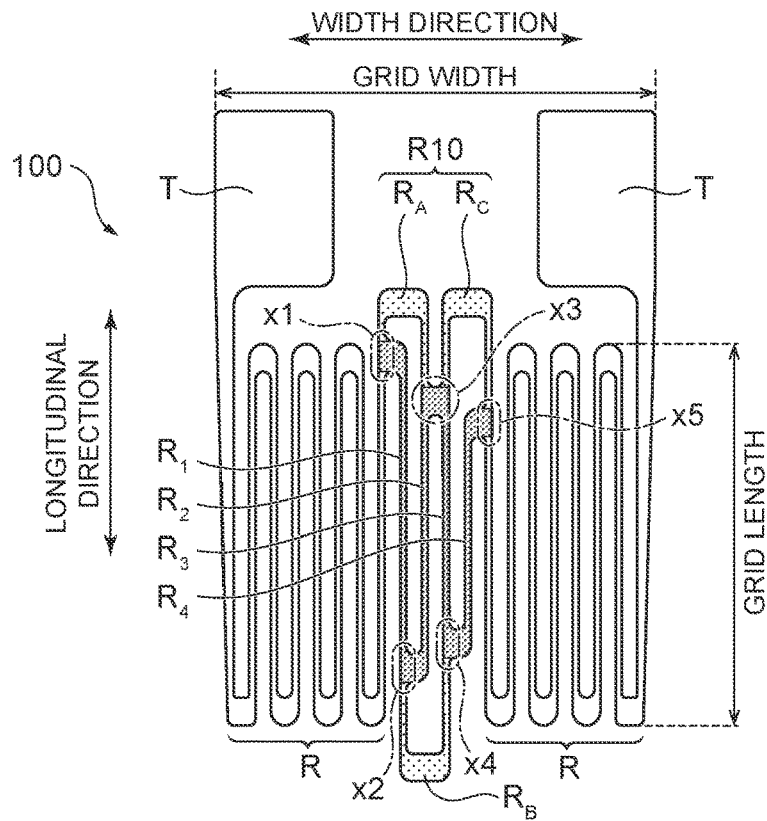
FIGS. 2A and 2B are plan views of the strain gauge according to the first embodiment of the present disclosure.

FIG. 2A is a plan view of a strain gauge 100 including the circuit diagram 10 illustrated in FIG. 1.

The strain gauge 100 includes a film-like member (not illustrated) made of a resin material being an insulator and having flexibility, and a resistor made of a metallic foil and patterned on the film-like member. The resistor includes two terminal portions T, resistor portions R each extending from each of the terminal portion T and patterned in such a manner as to be folded in a zigzag manner by a given grid length, and a resistor portion R10 connected to the two resistor portions R and equivalent to the circuit diagram 10 illustrated in FIG. 1. A grid resistor $R_1$ running from an intersection x1 to an intersection x2, a grid resistor $R_2$ running from the intersection x2 to an intersection x3, a grid resistor $R_3$ running from the intersection x3 to an intersection x4, and a grid resistor $R_4$ running from the intersection x4 to an intersection x5 are connected to each other in series, and patterned in such a manner as to be folded in a zigzag manner with each of the grid resistors. The resistor portion R10 includes folded portions each formed on a ridge side or a trough side. Specifically, at the intersection x1 a folded portion of the grid resistor $R_1$ is formed on the ridge side, at the intersection x2 a folded portion of the grid resistors ($R_1$, $R_2$) is formed on the trough side, at the intersection x3 a folded portion of the grid resistors ($R_2$, $R_3$) is formed on the ridge side, at the intersection x4 a folded portion of the grid resistors ($R_3$, $R_4$) is formed on the trough side, and at the intersection x5 a folded portion of the grid resistor $R_4$ is formed on the ridge side. A relation in length (i.e., resistance value) of the resistor portion R10 is $R_1 > R_2 > R_3 > R_4$.

At the intersection x1 the folded portion of the grid resistor $R_1$ is formed on the ridge side, and at the intersection x3 the folded portion of the grid resistors ($R_2$, $R_3$) is formed on the ridge side. Therefore, the trim resistor $R_A$ is connected at folded portions adjacent to each other on the ridge side, that is, between the intersections (x1, x3).

At the intersection x2 the folded portion of the grid resistors ($R_1$, $R_2$) is formed on the trough side, and at the intersection x4 the folded portion of the grid resistors ($R_3$, $R_4$) is formed on the trough side. Therefore, the trim resistor $R_B$ is connected at folded portions adjacent to each other on the trough side, that is, between the intersections (x2, x4).

At the intersection x3 the folded portion of the grid resistors ($R_2$, $R_3$) is formed on the ridge side, and at the intersection x5 the folded portion of the grid resistor $R_4$ is formed on the ridge side. Therefore, the trim resistor $R_C$ is connected at folded portions adjacent to each other on the ridge side, that is, between the intersections (x3, x5).

The resistor portion R10 includes the grid resistors ($R_1$, $R_2$, $R_3$, $R_4$) disposed between the trim resistors ($R_A$, $R_C$) on the ridge side and the trim resistor $R_B$ on the trough side, having what is called a nested structure.

Since the resistor portion R10 of the strain gauge 100 is provided with the trim resistors ($R_A$, $R_B$, $R_C$) at all of the folded portions adjacent to each other, it is possible to reduce a grid width of the strain gauge, achieving reduction of the strain gauge in size. That is, the number of trim resistors provided per unit width is increased. Therefore, an advantageous effect of increasing choices of resistance value adjustment is produced.

In addition, the resistor portion R10 is formed substantially in the middle of the strain gauge 100 both in a width direction (horizontal direction in the drawing) and in a longitudinal direction (vertical direction in the drawing), and the trim resistors ($R_A$, $R_B$, $R_C$) are provided both on the ridge side and the trough side. Therefore, an advantageous effect of achieving symmetry of the strain gauge is also produced.

Figure 2B:
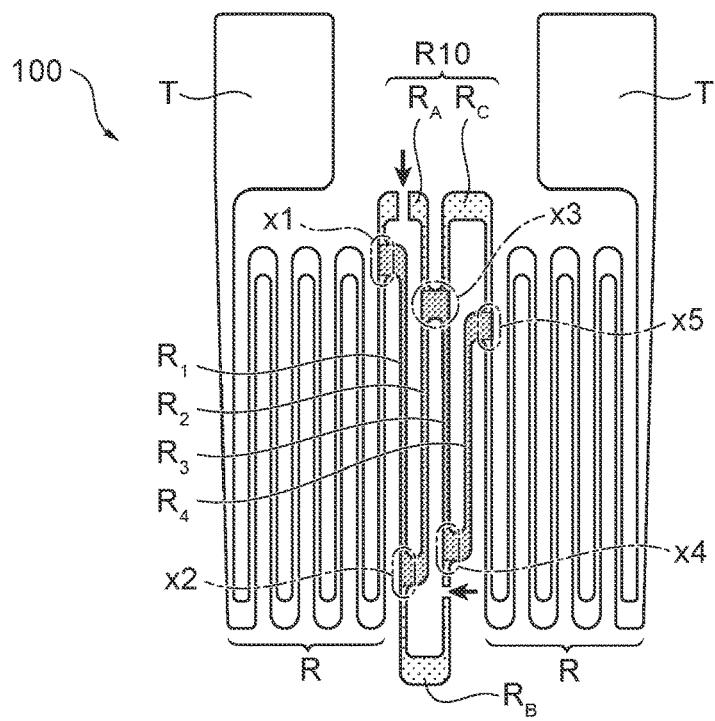

As illustrated by arrows in FIG. 2B, by disconnecting the trim resistors ($R_A$, $R_B$) by laser trimming or the like, the resistance value of the resistor portion R10 can be adjusted. A disconnecting position may be substantially in the middle of the trim resistor $R_A$ as a disconnecting position of the trim resistor $R_A$, or may be in a vicinity of an end of the trim resistor $R_B$ as a disconnecting position of the trim resistor $R_B$.

FIGS. 3A to 3E are diagrams for the description of calculating a combined resistance of the circuit diagram 10 of the strain gauge.

Figure 3A:
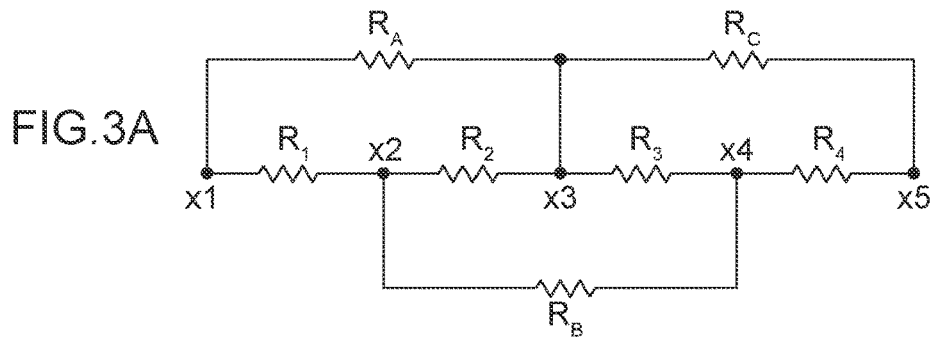
FIGS. 3A to 3E are diagrams for description of calculating a combined resistance of the circuit diagram of the strain gauge according to the first embodiment of the present disclosure.
Figure 3B:
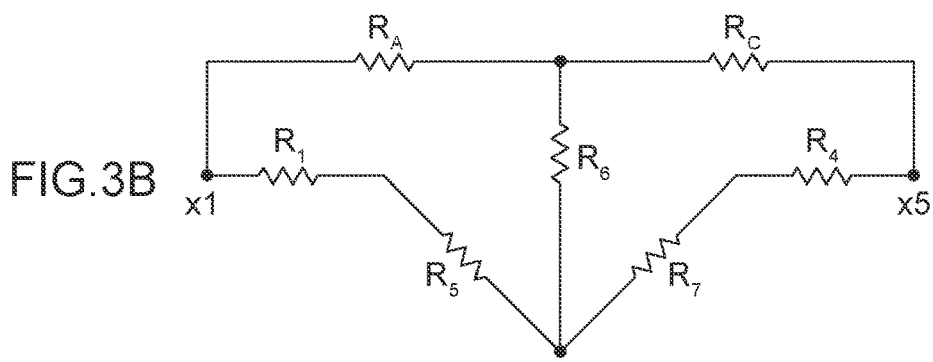

In a circuit illustrated in FIG. 3A, ($R_2$, $R_3$, $R_B$) are converted into ($R_5$, $R_6$, $R_7$) through the Δ-Y conversion, deriving an electrically equivalent circuit illustrated in FIG. 3B.

$$R_5 = R_2 \cdot R_B / (R_2 + R_3 + R_B)$$

$$R_6 = R_2 \cdot R_3 / (R_2 + R_3 + R_B)$$

$$R_7 = R_B \cdot R_3 / (R_2 + R_3 + R_B)$$

Figure 3C:
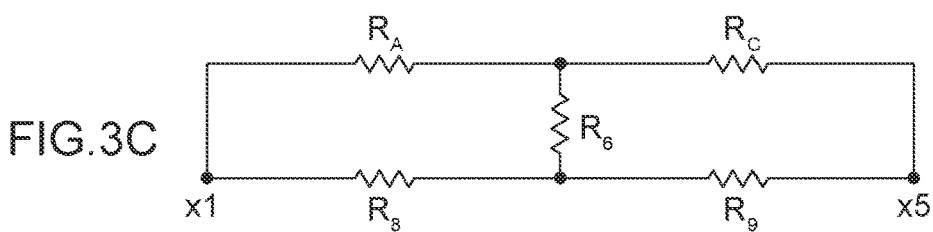

Next, ($R_1 + R_5$) and ($R_7 + R_4$) in the circuit illustrated in FIG. 3B are each combined, deriving an electrically equivalent circuit illustrated in FIG. 3C.

$$R_8 = R_1 + R_5$$

$$R_9 = R_7 + R_4$$

Figure 3D:
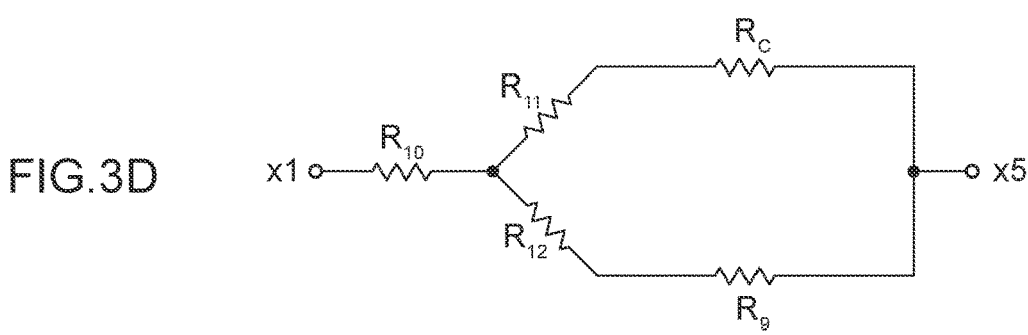

Next, in the circuit illustrated in FIG. 3C, ($R_A$, $R_6$, $R_8$) are converted into ($R_{10}$, $R_{11}$, $R_{12}$) through the Δ-Y conversion, deriving an electrically equivalent circuit illustrated in FIG. 3D.

$$R_{10} = R_A \cdot R_8 / (R_A + R_6 + R_8)$$

$$R_{11} = R_A \cdot R_6 / (R_A + R_6 + R_8)$$

$$R_{12} = R_6 \cdot R_8 / (R_A + R_6 + R_8)$$

Figure 3E:
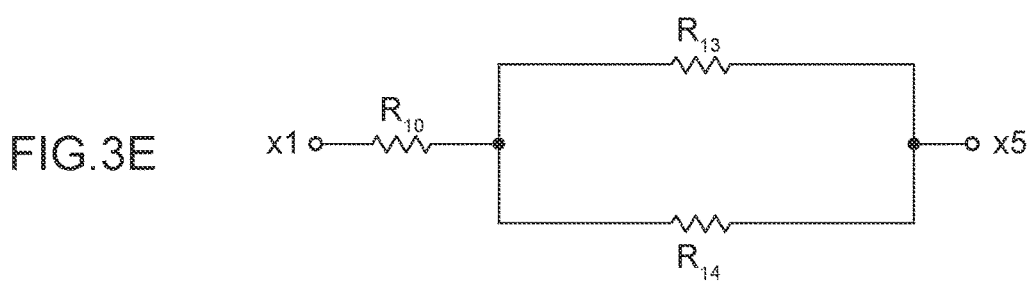

Next, ($R_{11} + R_C$) and ($R_9 + R_{12}$) in the circuit illustrated in FIG. 3D are each combined, deriving an electrically equivalent circuit illustrated in FIG. 3E.

$$R_{13} = R_{11} + R_C$$

$$R_{14} = R_9 + R_{12}$$

Then, a combined resistance R between x1 and x5 is as follows.

$$R = R_{10} + R_{13} \cdot R_{14} / (R_{13} + R_{14})$$

FIG. 1 to FIG. 3 described above illustrate a minimal configuration of the strain gauge according to the present disclosure, and a grid resistor and a trim resistor can be added. Modifications of the strain gauge according to the present disclosure will be described below.

Figure 4A:
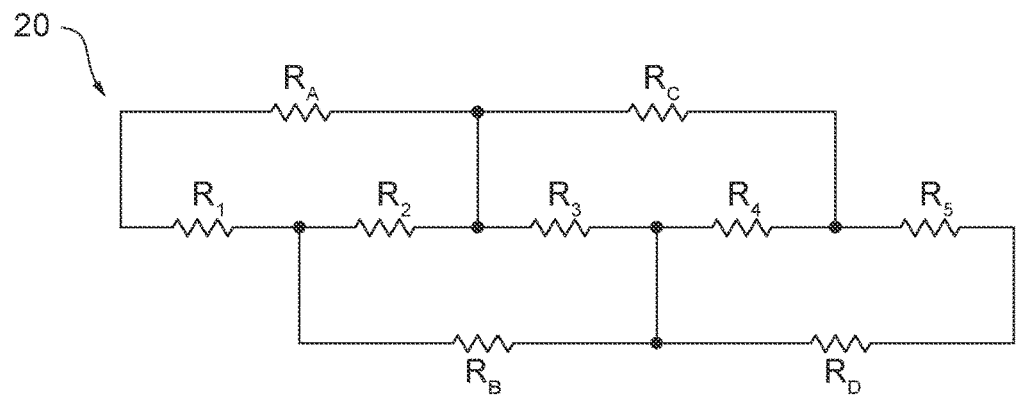
FIGS. 4A and 4B are diagrams illustrating a strain gauge according to a second embodiment of the present disclosure.
Figure 4B:
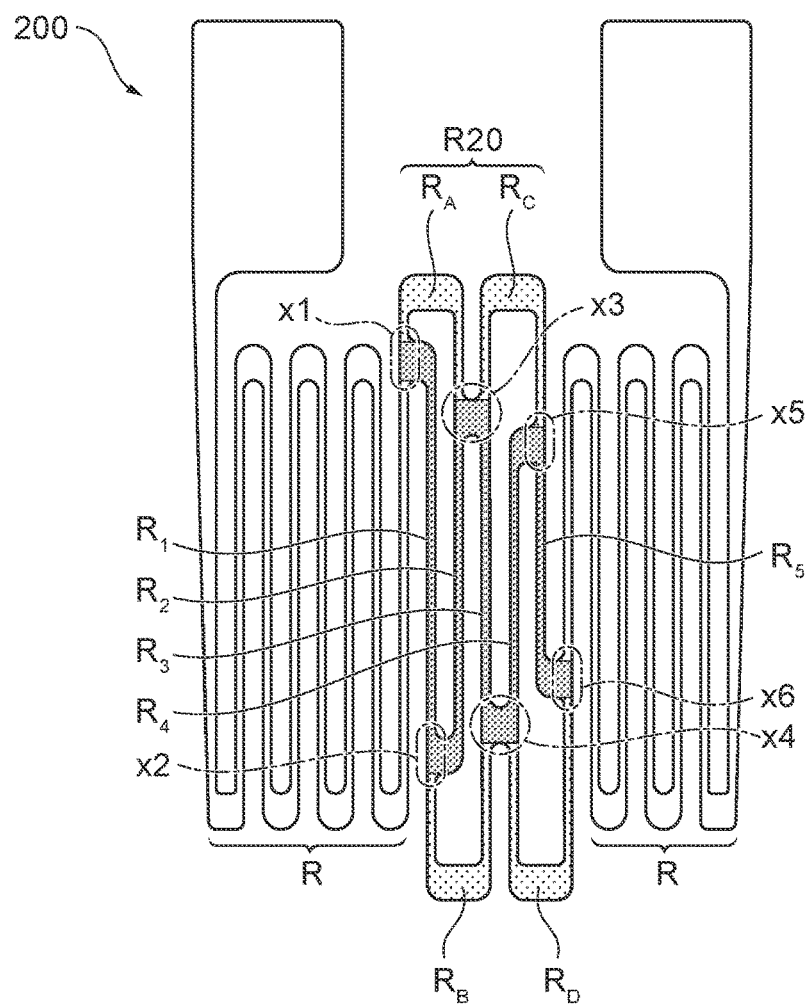

FIG. 4A is a circuit diagram 20 of a strain gauge according to a second embodiment, and FIG. 4B is a plan view of a strain gauge 200 including the circuit diagram 20.

The configuration of the second embodiment is the same as the configuration in the first embodiment except that a grid resistor $R_5$ and a trim resistor $R_D$ are added to a resistor portion R20.

As illustrated in FIG. 4A, the trim resistor $R_D$ is connected to a series circuit in parallel, the series circuit being constituted by two grid resistors ($R_4$, $R_5$) adjacent to each other.

As illustrated in FIG. 4B, a grid resistor $R_5$ is formed from the intersection x5 to an intersection x6, and the trim resistor $R_D$ is connected between the intersections (x4, x6).

In the second embodiment, a combined resistance of the circuit diagram 20 can be adjusted by disconnecting one or more of the four trim resistors ($R_A$, $R_B$, $R_C$, $R_D$) by laser trimming or the like. In accordance with whether to disconnect any one or more of the four trim resistors ($R_A$, $R_B$, $R_C$, $R_D$), the combined resistance can be adjusted in 16 possible ways.

Figure 5A:
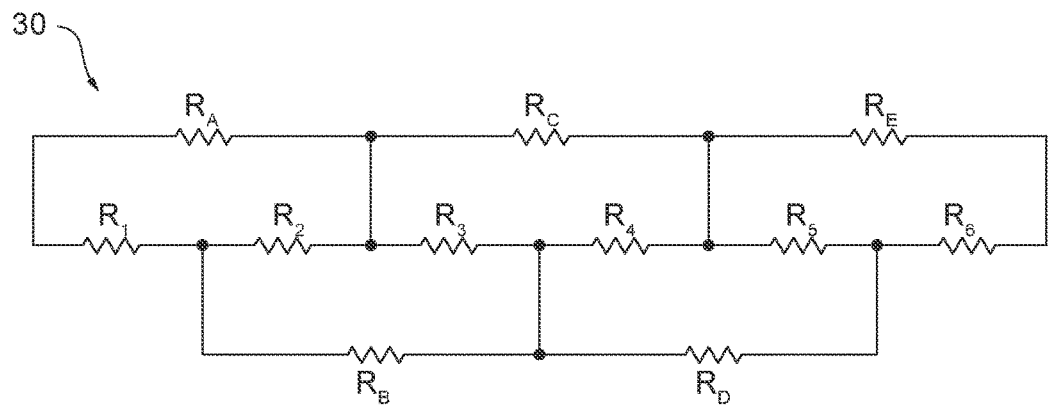
FIGS. 5A and 5B are diagrams illustrating a strain gauge according to a third embodiment of the present disclosure.
Figure 5B:
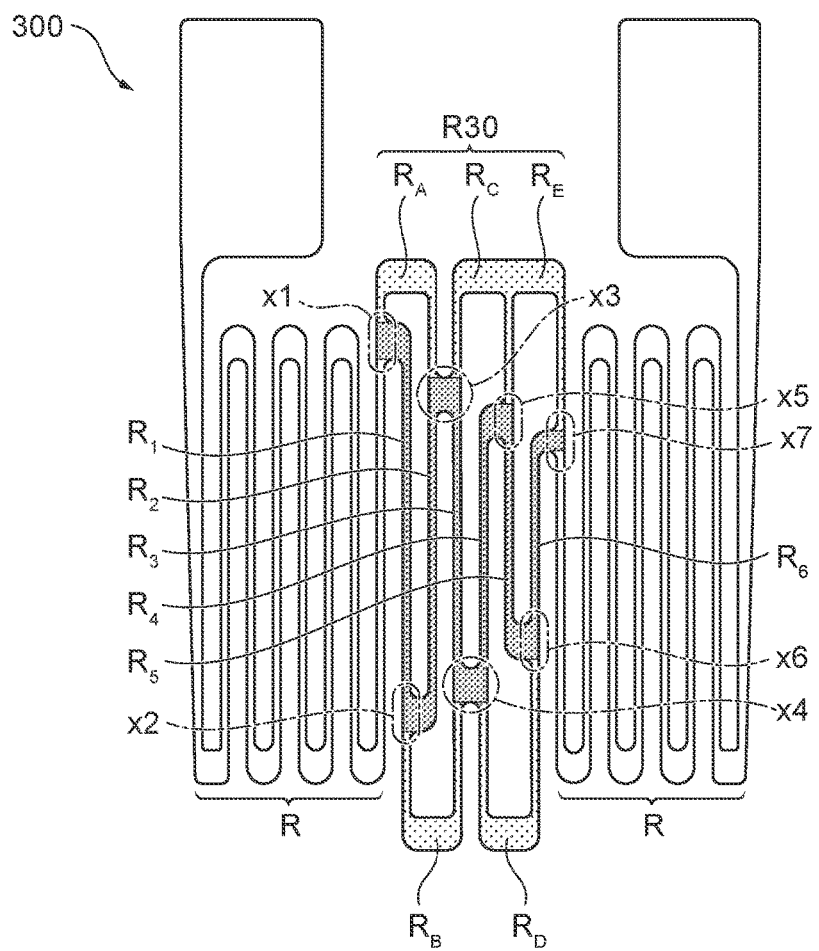

FIG. 5A is a circuit diagram 30 of a strain gauge according to a third embodiment, and FIG. 5B is a plan view of a strain gauge 300 including the circuit diagram 30.

The configuration of the third embodiment is the same as the configuration in the first embodiment except that grid resistors ($R_5$, $R_6$) and trim resistors ($R_D$, $R_E$) are added to a resistor portion R30.

As illustrated in FIG. 5A, the trim resistor $R_D$ is connected to a series circuit in parallel, the series circuit being constituted by two grid resistors ($R_4$, $R_5$) adjacent to each other, and the trim resistor $R_E$ is connected to a series circuit in parallel, the series circuit being constituted by two grid resistors ($R_5$, $R_6$) adjacent to each other.

As illustrated in FIG. 5B, the grid resistor $R_5$ is formed from the intersection x5 to the intersection x6, the trim resistor $R_D$ is connected between the intersections (x4, x6), the grid resistor $R_6$ is formed from the intersection x6 to an intersection x7, and the trim resistor $R_E$ is connected between the intersections (x5, x7).

In the third embodiment, a combined resistance of the circuit diagram 30 can be adjusted by disconnecting one or more of the five trim resistors ($R_A$, $R_B$, $R_C$, $R_D$, $R_E$) by laser trimming or the like. In accordance with whether to disconnect any one or more of the five trim resistors ($R_A$, $R_B$, $R_C$, $R_D$, $R_E$), the combined resistance can be adjusted in 31 possible ways.

Figure 6:
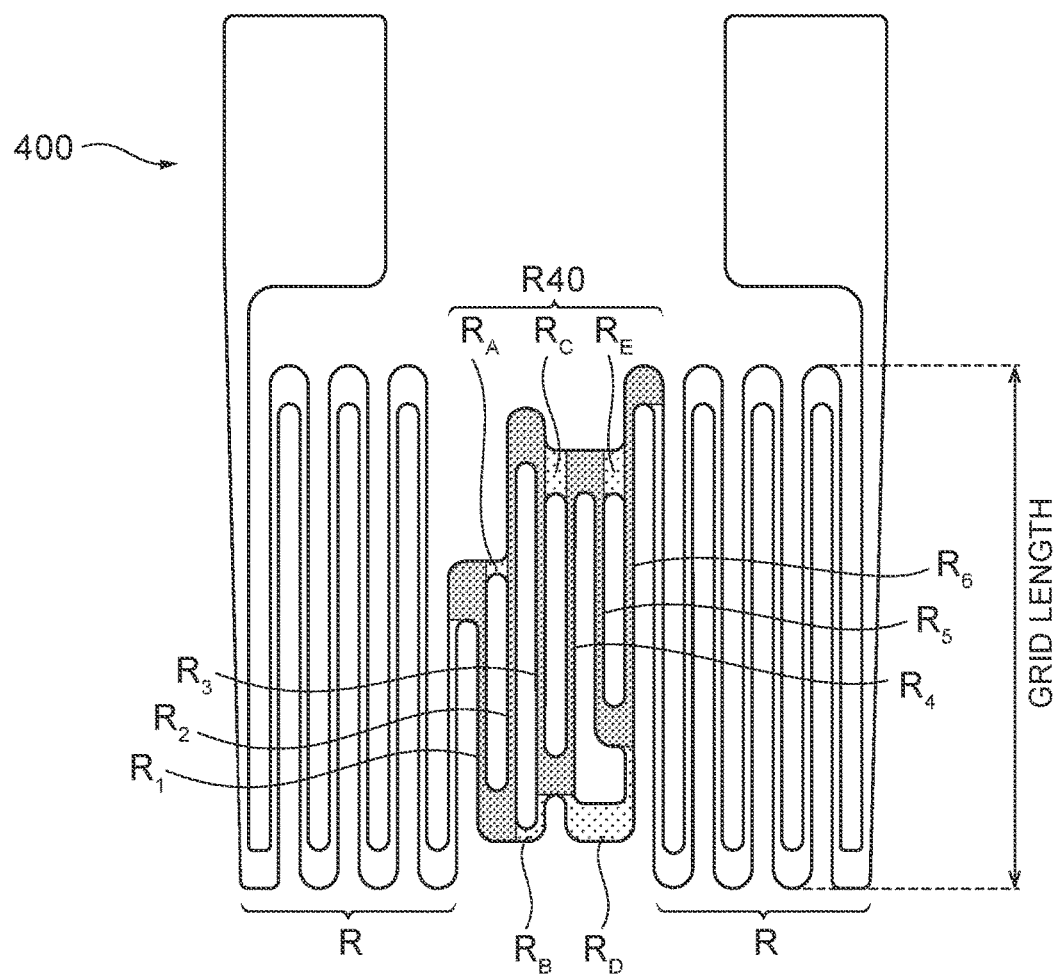
FIG. 6 is a diagram illustrating a strain gauge according to a fourth embodiment of the present disclosure.
Figure 7:
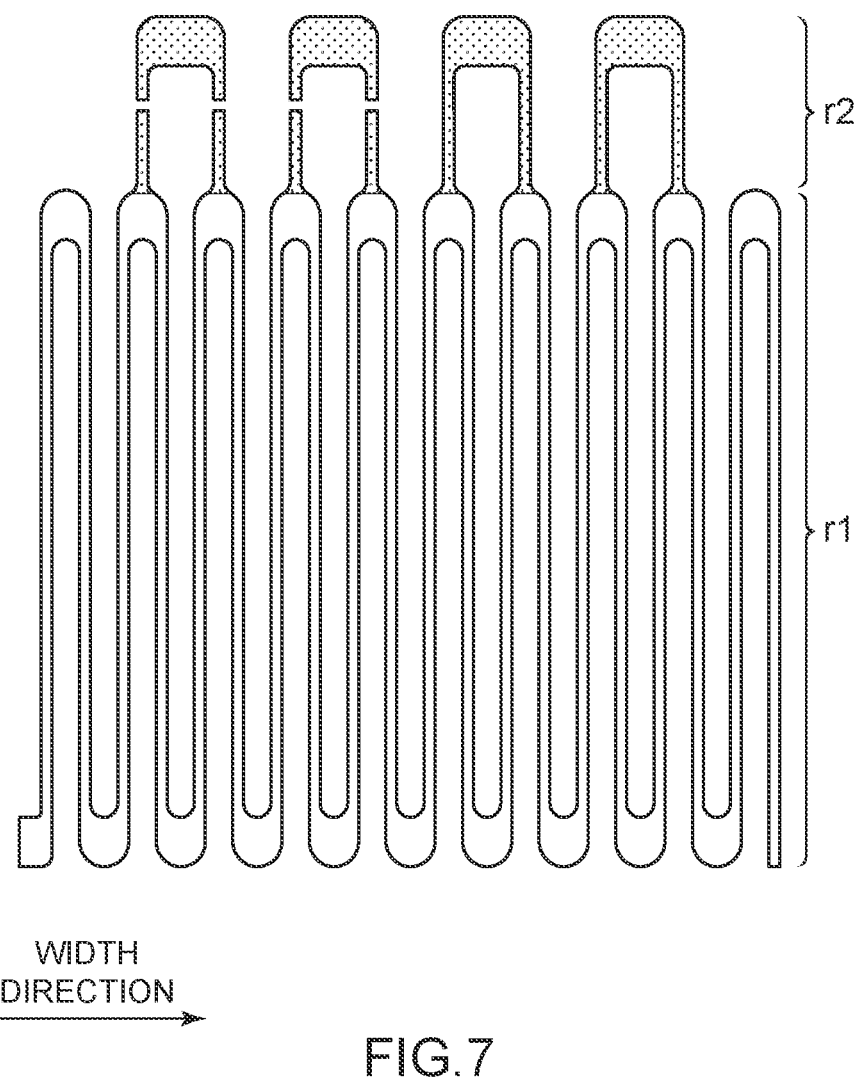
FIG. 7 is a diagram illustrating a conventional strain gauge.

FIG. 6 is a plan view of a strain gauge 400 according to a fourth embodiment.

In the first to third embodiments described above, the trim resistors ($R_A$, $R_C$, $R_E$) are each connected between folded portions adjacent to each other on the ridge side and extend to an upper side over the grid length, and the trim resistors ($R_B$, $R_D$) are each connected between folded portions adjacent to each other on the trough side and extend to a lower side over the grid length. However, in the fourth embodiment, the trim resistors ($R_A$, $R_B$, $R_C$, $R_D$, $R_E$) are disposed within the grid length.

In the first to third embodiments described above, as for the grid resistors of the resistor portions (R10, R20, R30), the grid resistor closer to the left in the drawing has a larger size, and a relation of $R_1>R_2>R_3>R_4>R_5>R_6$ is established. However, in the fourth embodiment, resistance values of the resistor portion R40 are in a relation of $R_2>R_3>R_6>R_4>R_5>R_1$. As above, the grid resistors may have resistance values different from one another and need not be arranged in order of size.

In the first to fourth embodiments described above, line widths of the grid resistors are uniform, and the resistance values of the grid resistors are adjusted by changing lengths of the grid resistors, however the resistance values may be adjusted by changing the widths of the grid resistors. However, from the viewpoint of inspection criterion, it is preferable to equalize the line widths of the grid resistors.

What is claimed is:

1. A strain gauge comprising:
   at least four grid resistors connected to each other in series; and
   at least three trim resistors each connected to a series circuit in parallel, the series circuit being constituted by two grid resistors adjacent to each other, of the at least four grid resistors, wherein
   the at least four grid resistors have resistance values different from one another.

2. The strain gauge according to claim 1, wherein
   the at least four grid resistors are patterned in such a manner as to be folded in a zigzag manner with each of the grid resistors, and include folded portions each formed on a ridge side or a trough side, and
   each of the at least three trim resistors is connected between folded portions adjacent to each other on the ridge side or between folded portions adjacent to each other on the trough side.

3. The strain gauge according to claim 1, wherein
   the at least four grid resistors have a uniform line width and have lengths different from each other.

4. The strain gauge according to claim 2, wherein
   the at least four grid resistors have a uniform line width and have lengths different from each other.

5. The strain gauge according to claim 1, wherein the four grid resistors connected to each other in series are identified as R1, R2, R3, R4 and have resistance values different from one another such that R2>R3>R4.

6. The strain gauge according to claim 5, wherein the resistance values of R1 and R2 are different from one another such that R1>R2.

7. The strain gauge according to claim 5, wherein the resistance values of R1 and R4 are different from one another such that R1<R4.

* * * * *